Oct. 1, 1968  F. E. MacSPADDEN, JR  3,403,917
DYNAMIC SHAFT SEALING DEVICE
Filed Nov. 19, 1965
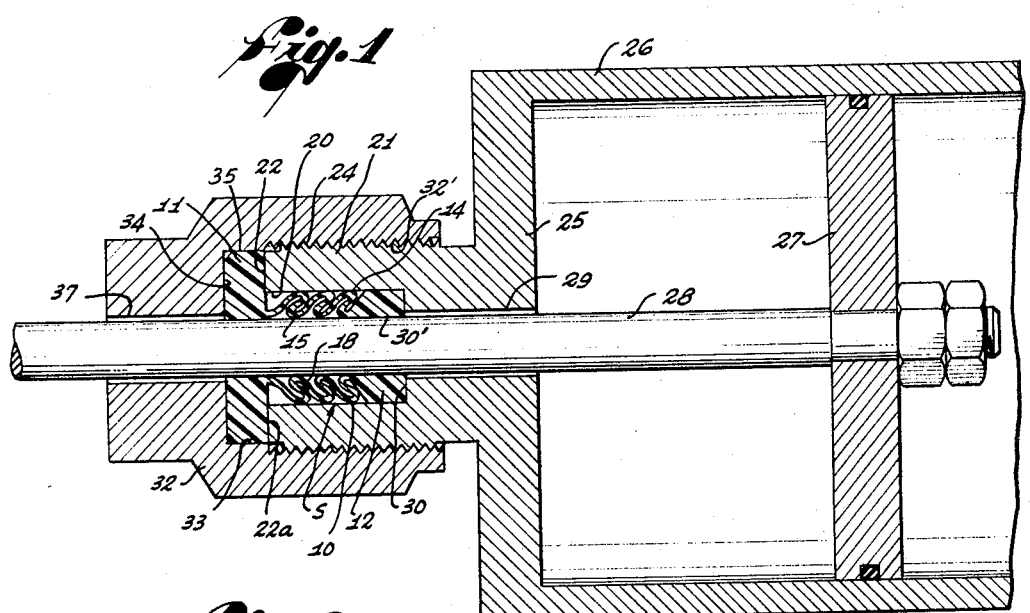
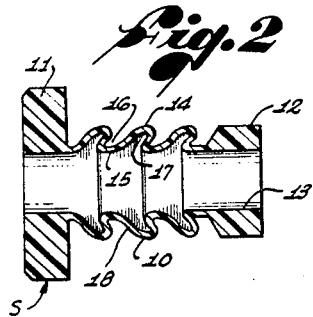
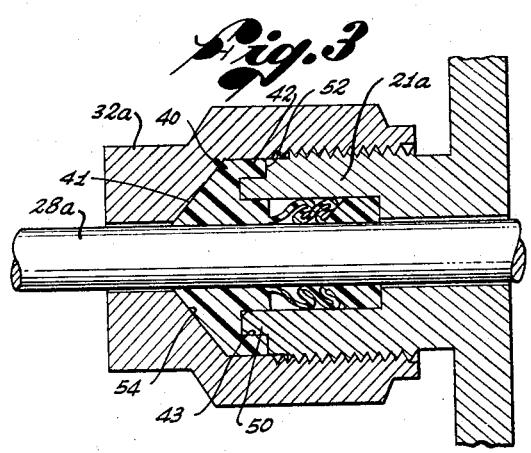
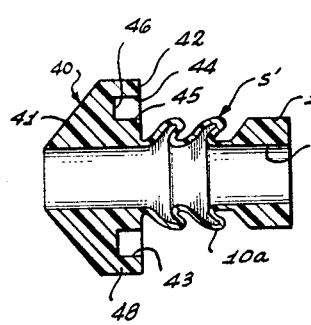
INVENTOR.
FLOYD E. MacSPADDEN Jr.
BY Forrest J. Lilly
ATTORNEY

United States Patent Office

3,403,917
Patented Oct. 1, 1968

3,403,917
DYNAMIC SHAFT SEALING DEVICE
Floyd E. MacSpadden, Jr., Huntington Park, Calif., assignor to Robbins Aviation, Inc., Vernon, Calif., a corporation of California
Filed Nov. 19, 1965, Ser. No. 508,739
6 Claims. (Cl. 277—110)

ABSTRACT OF THE DISCLOSURE

A shaft seal employing a Teflon seal sleeve snugly surrounding the shaft, being circumferentially corrugated, and whose corrugations make sealing engagement with the shaft and a seal bore, the sleeve having at one end a collar slideable in the seal bore, and at the other an enlarged head which is clamped between a retainer seating surface and an interior face on a bonnet screwed onto the retainer.

---

This invention relates generally to improvements in fluid seals for shafts, and more particularly to an improved and simplified dynamic shaft sealing device which is capable of effectively sealing a movable shaft under a wide range of temperatures, as from −65° F., or even down to the cryogenic range, and up to temperatures to or above 165° F.

The present invention may be regarded as providing simplification and improvements in shaft seals and in combined shaft seals and shaft bearings, as of types such as disclosed in copending patent application Ser. No. 397,837, filed Sept. 21, 1964, for Dynamic Shaft Seal, by Edwin C. Lowe, and Ser. No. 397,793, filed Sept. 21, 1965, for Dynamic Shaft Sealing Device and Bushing Therefor, by Edwin C. Lowe, to which reference is here made.

Application Ser. No. 397,837 disclosed a shaft seal preferably of a resilient, low friction plastic material, typically polytetrafluoroethylene, commonly known by its trademark Teflon. This seal is comprised of a sleeve which has been mechanically compressed endwise, and thereby forced to assume a circumferentially corrugated or convoluted form, of which there are one or more radially outwardly directed corrugations, loops or folds, and one or more radially inwardly directed corrugations, loops or folds. The outwardly directed corrugations contact the interior cylindrical wall of a retainer, and the inwardly directed corrugations contact a shaft extending axially therethrough. The corrugated sleeve it placed under endwise compression while being installed, and thereby resiliently deformed in the lengthwise dimension, thereby causing the corrugations to become pressed into sealing engagement with the interior cylindrical wall of the retainer and the exterior surface of the shaft. Thus, an effective seal is formed for ambient temperatures. The Teflon material has a substantially higher coefficient of expansion than does steel (which is a typical material for the valve), in the ratio of about 8 to 1. For high temperatures, the Teflon seal as described expands, and does so at greater rate than the retainer or the shaft; and thus its inside and outside corrugations press and seal more effectively than at ambient conditions. Under extremely low temperature conditions, the seal contracts radially, and thus seals very tightly to the shaft. However, this contraction may sometimes be so great that the sealing effectiveness of the outwardly directed corrugations deteriorates or is lost.

An object of the invention is accordingly the provision of an improved means for sealing around the outside of such a corrugated sealing device, particularly for the extremely low temperature range.

A further object is to utilize a seal of the type mentioned in an improved and simplified configuration such as to afford also a self-centering bearing for the shaft.

The invention will be understood more fully from the following detailed description of certain present preferred forms thereof, in illustrative shaft sealing applications, and in which:

FIG. 1 is a longitudinal sectional view through a simple form of shaft seal in accordance with the invention, the view showing the seal in a representative application;

FIG. 2 is a view showing the sealing device removed from its retainer, and therefore in uncompressed, unexpanded position;

FIG. 3 shows a modification, in which the seal incorporates also a self-centering or aligning feature, and also an improved cold seal feature; and FIG. 4 shows the seal of FIG. 3 removed from its retainer, and in an uncompressed, expanded condition.

Referring first to FIG. 2, the seal S as illustrated therein comprises a circumferentially corrugated or convoluted relatively thin-walled sleeve 10, with a disk-like head or collar 11 at one end thereof, and a smaller diameter collar 12 at the other end thereof. Preferably, the collar 12 is of the same outside and inside diameters as the convoluted sleeve 10, while the head 11 is generally of larger diameter. A uniform diameter bore 13 extends longitudinally and axially through the head or collar 11, the convoluted sleeve 10 and the collar 12. The seal S is preferably and ideally made of polytetrafluoroethylene, known generally by its trademark Teflon, which is a synthetic plastic having a very low coefficient of friction, and good elasticity or resilience. Other substances of similar necessary properties might, of course, be substituted.

In an illustrative embodiment, the wall thickness of the convoluted sleeve is substantially .020 inch, its inside diameter or bore is .246–.247 inch, and the outside diameter of its corrugations or convolutions is typically .359 inch. The length of the initial sleeve prior to being given its convoluted form is typically .575 inch, and this length is then contracted to such a typical unstressed length as indicated in FIG. 2. The sleeve form of FIG. 2 is produced by applying endwise pressure on an initially straight sleeve, under lateral guidance and constraint, substantially as taught in application Ser. No. 397,868 filed Sept. 21, 1964, by Edwin C. Lowe for Corrugating Method and Apparatus, and assumes the convoluted form by plastic cold flow. In the form of FIG. 2, the device consists, actually, of a compression spring, whose convolutions or corrugations will then tend to elastically buckle under endwise compressive force, elastically deforming to a condition of increased outside diameter and reduced inside diameter. Considered more particularly, the sleeve has alternating outwardly directed circumferential corrugations, convolutions or loops 14 and inwardly directed circumferential corrugations or loops 15. These corrugations or loops form outwardly opening and inwardly opening circumferential cavities 16 and 17, respectively. The outwardly and inwardly directed convolutions are joined by generally conical wall portions 18 which are inclined at an acute angle to the axis of the seal. In the free condition of FIG. 2, the outwardly directed convolutions 14 and inwardly directed convolutions 15 are of the same outside and inside diameters as the collar 12.

The sealing device S is installed in a cylindrical bore 20 extending longitudinally and axially into a seal retainer 21. This seal retainer 21 has a front end face 22, in this case of annular form, and disposed in a plane at right angles to the bore 20. Also, in the present instance, the retainer 21 is of cylindrical external form, and is externally screw threaded, as indicated at 24. The retainer is shown to project from the end 25 of a cylinder 26 containing a piston 27, and the shaft 28 of this piston extends through a bore 29 in the end wall of the cylinder, and this bore 29 coaxially meets the inner end of the aforementioned retainer bore 20. The bore 29 is preferably of a diameter to freely pass the piston shaft 28, while the retainer bore 20 is of larger diameter, being dimensioned to snugly receive the end collar 12 and convoluted sleeve 10 of the seal.

The seal S in its relaxed condition (FIG. 2), measured from the end of collar 12 to the face 22a of head 11, is substantially greater than the depth of bore 20, from face 22 to the shoulder 30 at the inner end of the bore 20, and is thus placed under considerable elastic compression when the head 11 of the seal is held against the end face 22 on the retainer 21. The assembly is completed by a housing means, such as an end cap or bonnet 32, screwed onto retainer 21, and formed at the inner end of its screw threaded bore 32' with a flat cylindrical cavity 33 to snugly receive and seat the head 11 of the seal S. Thus the head 11 fits down flat against the flat bottom surface 34 of cavity 33, and also its periphery 35 fits closely inside the side wall of the cavity 33. The bonnet 32 may have exterior wrench faces, not shown, by which it may be screwed on tightly over the retainer 21. Especially for extremely cold seals, the bonnet is screwed on far enough to cause the end face 22 of the retainer to become slightly depressed into the material of the head 11, maintaining the outer or peripheral region of head 11 under compression, so as to thus form a very effective pressure seal at that point. The bonnet 32 is bored, as at 37, to loosely pass the shaft 28.

The shaft 28 thus passes loosely through the bonnet, and through the bore 29. It fits snugly through the head 11, sleeve 10, and collar 12 of the seal, the fit preferably being substantially or nearly an interference fit, within the limits, of course, that the shaft 28 is to have capability of relatively free longitudinal and/or rotary movement therethrough throughout an operating range of temperatures. It might be here mentioned that while the present application of the invention is to a seal for a longitudinally movable shaft, the same seal serves equally well for a rotary shaft, as in a valve.

The axial compression of the seal S when installed crowds the convolutions together, and additional compression and crowding results from leakage of high pressure fluid from the cylinder 26 through the bore 29 to the end collar 12. In this crowding action, each wall portion 18 of the seal is forced into a position more normal to the shaft, and thus the convolutions are wedged, so to speak, more tightly between the shaft and the surface of the retainer bore 20. The individual convolutions of the seal thus press so tightly against the shaft and the retainer bore surface as to effect a very effective seal. High pressure fluid from the cylinder 26 leaking along the shaft 28 to the seal is thus sealed off both along the shaft, and at the surface of the retainer bore. This seal maintains its integrity during either or both longitudinal and rotary movements of the shaft.

Assume now a high temperature condition. The seal S, being composed of a material of high coefficient of expansion, expands thermally very much more than does the shaft and retainer, about eight times more in the case of Teflon for the seal and steel for the shaft and retainer. The convolutions of the expanding seal thus are increasingly crowded as temperature rises, and the seal, though of increasing flexibility with temperature, retains its integrity.

Under cold conditions, the seal contracts more rapidly than the steel shaft and retainer, causing the inwardly directed convolutions of the seal to contract relatively to the shaft. Thus the seal along the shaft is preserved. The outwardly directed convolutions will remain in good sealing contact with the cylindrical surface of the retainer 20 through a substantially temperature drop below ambient. However, at extremely low temperatures, the contraction of the Teflon seal can be so great relative to the steel retainer that leakage of pressured fluid from the cylinder past the outside of the convoluted seal may sometimes occur. In such case, an adequate seal is provided by the pressural engagement of the end face of the retainer against the Teflon head 11 on the end of the convoluted sealing device S. To this end, the bonnet 32 should be screwed on tightly enough to initially compress the peripheral region of the head 11. As the head then tends to contract in thickness with low temperatures, such contraction is counteracted by a tendency for the head 11 to elastically expand owing to relief of compressive force. The seal is thus maintained.

Reference is next directed to FIGS. 3 and 4, showing modifications, both for the provision of a self-centering shaft bearing formed integrally with the seal, and for the purpose of an improved seal for the potential leakage path outside the corrugated sealing device at low temperatures.

A sealing device S' is provided which has a corrugated or convoluted sleeve part 10a, like that of FIGS. 1 and 2 with the exception that the embodiment of FIGS. 3 and 4 shows only two convolutions, while that of FIGS. 1 and 2 employs three of the convolutions. In this connection, it should be mentioned that there is no necessary number of convolutions, and that a single convolution may serve in some simple applications, while still more than three may be of advantage in certain other applications.

The sealing device S' has an end collar 12a exactly like the collar 12 of FIGS. 1 and 2, and has at its other extremity a head 40, in replacement of the disk-type head 11 of FIGS. 1 and 2, formed with a frusto-conical front face 41. The head 40 may, in fact, be considered to amount to the disk-like head part 11 of FIG. 2, with the addition thereto of a frusto-conical portion on the front side thereof presenting the frusto-conical face 41.

The seal has a bore 13a extending, when the device is in the free condition of FIG. 4, at uniform diameter through the collar 12a, the corrugated section 10a, and the head 40. Additionally, there is sunk into the rearward face or shoulder 42 of the head 40 an annular channel 43, defined by two concentric and annularly spaced surfaces 44 and 45, and a bottom 46 which is preferably normal to the longitudinal axis of the seal. The head 40 is thus formed with a rearwardly extending cylindric lip 48.

FIG. 3 shows the seal of FIG. 4 installed in a retainer and body assembly conforming in most respects to that of FIG. 1, and corresponding parts in FIG. 3 are accordingly designated by similar reference numerals but with the suffix a added in the case of FIG. 3.

It will be seen that the retainer 21a in the case of FIG. 3 has a cylindrical, annular flange 50 projecting forwardly from its front end into the channel 43 formed in the head 40. The extremity of the lip 48 thus seats against the shoulder 52 on the retainer at the base of the flange 50. Preferably, the lip 48 is made slightly longer than the flange 50, for a reason which will appear presently. The device is completed by bonnet 32a, which is screwed onto the retainer, as shown, and this bonnet 32a may be seen to have a frusto-conical seating surface 54 which is centered carefully with the axis of the bonnet, and which engages the frusto-conical surface 41 on the head 40. When the bonnet 32a is screwed onto retainer 21a, and its internal frusto-conical surface 54 comes into seating engagement with the frusto-conical surface 41 on the head 40, there is a self-centering and self-aligning effect which assures precise alignment of the longitudinal axes of the head 40, the bonnet 32a, the retainer 21a screw threadedly joined to the bonnet, and the shaft 28a which is snugly or relatively tightly fitted inside the bore 13a extending through the seal head 40, the convoluted sleeve section 10a, and the collar 12a.

It was mentioned earlier that the lip 48 is preferably made slightly longer than the retainer flange 50, and this relationship may be established for all applications, though it has a unique function for extremely cold applications. In consequence of this relationship, when used, however, the peripheral or lip region 42 of the head 40 of the sealing device S' is placed under longitudinal elastic compression when the bonnet 32a is screwed tightly onto the retainer 21a. This compression can preserve the integrity of the seal under extremely cold conditions, as will be referred to again hereinafter.

The device in the form of FIGS. 3 and 4 affords, in the frusto-conical shaped head 40, a self-centering and aligning bearing for the shaft, it being clear that the frusto-conical head 40 in engagement with the frusto-conical seat 54 in the bonnet will align itself accurately with the predetermined longitudinal axis of the assembly, and will hold and support the shaft 28a centered on this axis. It will further appear that the head 40 is forced into pressural engagement with the seat 54 both by the pressure developed by screwing bonnet 32a onto retainer 21a and also by the axial pressure exerted by the convoluted sleeve acting as a compressed spring. The device of FIGS. 3 and 4 seals under ambient conditions, high temperature conditions, and low temperature conditions, the same as that of FIGS. 1 and 2. In addition, however, under extremely cold conditions, the lip 42 contracts radially against the flange 50, affording further sealing action at the interengaging surfaces at this point. In view of the fact that a seal is also afforded by the pressure of the shoulder 52 of the retainer against lip 42, the device of FIGS. 3 and 4 can be simplified for certain applications, by the simple omission of the channel 43 and the flange 50, relying instead, for a seal at low temperatures, upon a sufficient compression developed between the end of the retainer and the outer peripheral region of the head portion 40 of the sealing device, generally in the manner of FIG. 1.

It will be clear that the self-centering bearing afforded by the frusto-conical shaped head portion on the sealing device is operative through a wide temperature range, from very low to very high.

It will be understood that the embodiments of the invention illustrated and described herein are for illustrative purposes only and that various changes in design, structure and arrangement may be made without departing from the spirit and scope of the appended claims.

I claim:
1. A shaft seal assembly comprising:
   a retainer having a cylindrical bore therethrough for receiving a shaft with annular clearance therearound, said bore opening through one end of said retainer, and said end of said retainer having a seating surface around said bore,
   a tubular sealing device of a resilient plastic material comprising a circumferentially corrugated sleeve portion engaging said bore, and an enlarged head on the extremity of said sleeve portion overlying engaging said seating surface on said end of said retainer, said enlarged head and the corrugations of said sleeve portion of said tubular sealing device having an axial bore therethrough dimensioned for receiving said shaft snugly but for relatively free movement therein throughout a range of operating temperatures, said corrugated sleeve portion being formed into alternatively radially outwardly and radially inwardly directed loops, each of said loops being defined by relatively thin walls, each of said walls inclined in one direction relative to the axis of the sealing device, the direction of inclination being away from said enlarged head,
   abutment means forming a shoulder in said bore engaged by the end portion of said tubular sealing device opposite from said head, the distance between said shoulder and said seating surface of said retainer being such relative to the length of said sealing device that said corrugated portion of said sleeve portion of said device is axially elastically compressed when said sealing device is disposed in said retainer with its enlarged head in engagement with said seating surface,
   housing means connected to and forming a closure with said retainer surrounding said enlarged head of said sealing device and having an internal seating surface engaging axially thereagainst to hold said enlarged head against said seating surface of said retainer, said housing means having a central opening for receiving said shaft, and
   means for forcing said housing means and said retainer axially towards one another to clamp said enlarged head between said seating surface on said retainer and said internal seating surface in said housing means.

2. The subject matter of claim 1, wherein said housing means is screw threaded onto said retainer.

3. The subject matter of claim 1, wherein said housing means is screw threaded onto said retainer tightly enough to provide an effective fluid pressure seal between said head and said seating surface on said retainer.

4. The subject matter of claim 1, wherein said enlarged head of said sealing device and the opposed seating surface of said housing means are frusto-conical in form.

5. The subject matter of claim 4, wherein said enlarged head of said sealing device is compressed tightly between said seating surface of said retainer and said housing means.

6. The subject matter of claim 1, wherein said enlarged head of said sealing device has a lip with a cylindrical interior sealing surface extending therefrom coaxially of and outside said retainer bore, and said retainer has a coacting exterior cylindrical sealing surface adjacent said interior sealing surface on said lip.

References Cited
UNITED STATES PATENTS

| | | | |
|---|---|---|---|
| 550,601 | 12/1895 | Dresser | 277—105 |
| 1,875,936 | 9/1932 | Saunders | 277—110 |
| 1,891,417 | 12/1932 | Heggem | 277—110 |
| 1,840,312 | 1/1932 | Dunmire | 277—110 |
| 2,356,947 | 8/1944 | Pranger et al. | 277—200 X |
| 2,561,648 | 7/1951 | Bradley | 277—110 |
| 2,721,749 | 10/1955 | Crow | 277—212 X |
| 2,745,687 | 5/1956 | Stack | 277—110 |

LAVERNE D. GEIGER, *Primary Examiner.*

J. S. MEDNICK, *Assistant Examiner.*